United States Patent
Park et al.

(10) Patent No.: US 7,342,868 B2
(45) Date of Patent: Mar. 11, 2008

(54) COMPATIBLE OPTICAL PICKUP APPARATUS

(75) Inventors: Soo-Han Park, Yongin-si (KR); Bong-Gi Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 536 days.

(21) Appl. No.: 10/985,899

(22) Filed: Nov. 12, 2004

(65) Prior Publication Data

US 2005/0063263 A1   Mar. 24, 2005

(30) Foreign Application Priority Data

Jan. 16, 2003   (KR) .................................. 2003-2963

(51) Int. Cl.
*G11B 7/00* (2006.01)

(52) U.S. Cl. ........................ 369/112.09; 369/112.14; 369/112.27; 369/112.21; 369/44.37

(58) Field of Classification Search .................... None
See application file for complete search history.

(56) References Cited

U.S. PATENT DOCUMENTS

| | | | | |
|---|---|---|---|---|
| 5,751,491 A | 5/1998 | Kase et al. | ................ | 359/618 |
| 6,314,063 B1 | 11/2001 | Nemoto | ................ | 369/44.12 |
| 2002/0009040 A1* | 1/2002 | Takeshita et al. | ...... | 369/112.28 |

FOREIGN PATENT DOCUMENTS

| | | |
|---|---|---|
| JP | 2001-195769 | 7/2001 |
| JP | 2002-056568 | 2/2002 |
| JP | 2002-237082 | 8/2002 |
| KR | 1994-14685 | 7/1994 |
| KR | 1998-28154 | 7/1998 |
| KR | 1999-00768 | 1/1999 |
| KR | 2001-0056965 | 9/2002 |

* cited by examiner

*Primary Examiner*—Muhammad Edun
(74) *Attorney, Agent, or Firm*—Roylance, Abrams, Berdo & Goodman, LLP (57) ABSTRACT

A compatible optical pickup apparatus and method are provided. The apparatus and method include a first light source for generating and emitting a first light having a predetermined wavelength, a second light source for generating and emitting a second light having a wavelength different from the wavelength of the first light, a beam shaping beam splitter provided in paths of the first and second lights for shaping the first and second lights in order to change a shape of a profile of each of the first and second lights to a circular shape and change the paths of the first and second lights, an objective lens for focusing the first and second lights and forming light spots on an optical recording medium, and a main photodetector for receiving the first and second lights by being reflected from the optical recording medium and passing through the objective lens and the beam shaping beam splitter, and detecting an information signal and an error signal.

26 Claims, 7 Drawing Sheets

COMPATIBLE OPTICAL PICKUP APPARATUS

CROSS REFERENCE TO RELATED APPLICATIONS

This application is related to Korean Patent Application No. 2003-2963, filed on Jan. 16, 2003, and laid open on Jul. 23, 2004 in the Korean Intellectual Property Office, the entire contents of which is incorporated herein by reference.

BACKGROUND OF THE INVENTION

1. Field of the Invention

The present invention relates to a compatible optical pickup apparatus and method for recording and reproducing information with respect to optical recording media in different formats. More particularly, the present invention relates to a compatible optical pickup apparatus and method for using a beam shaping prism having an improved structure.

2. Description of the Related Art

In general, a compatible optical pickup apparatus can record and reproduce information with respect to optical recording media in different formats, for example, a Digital Video Disk (DVD) and a Compact Disk (CD).

Figure 1:
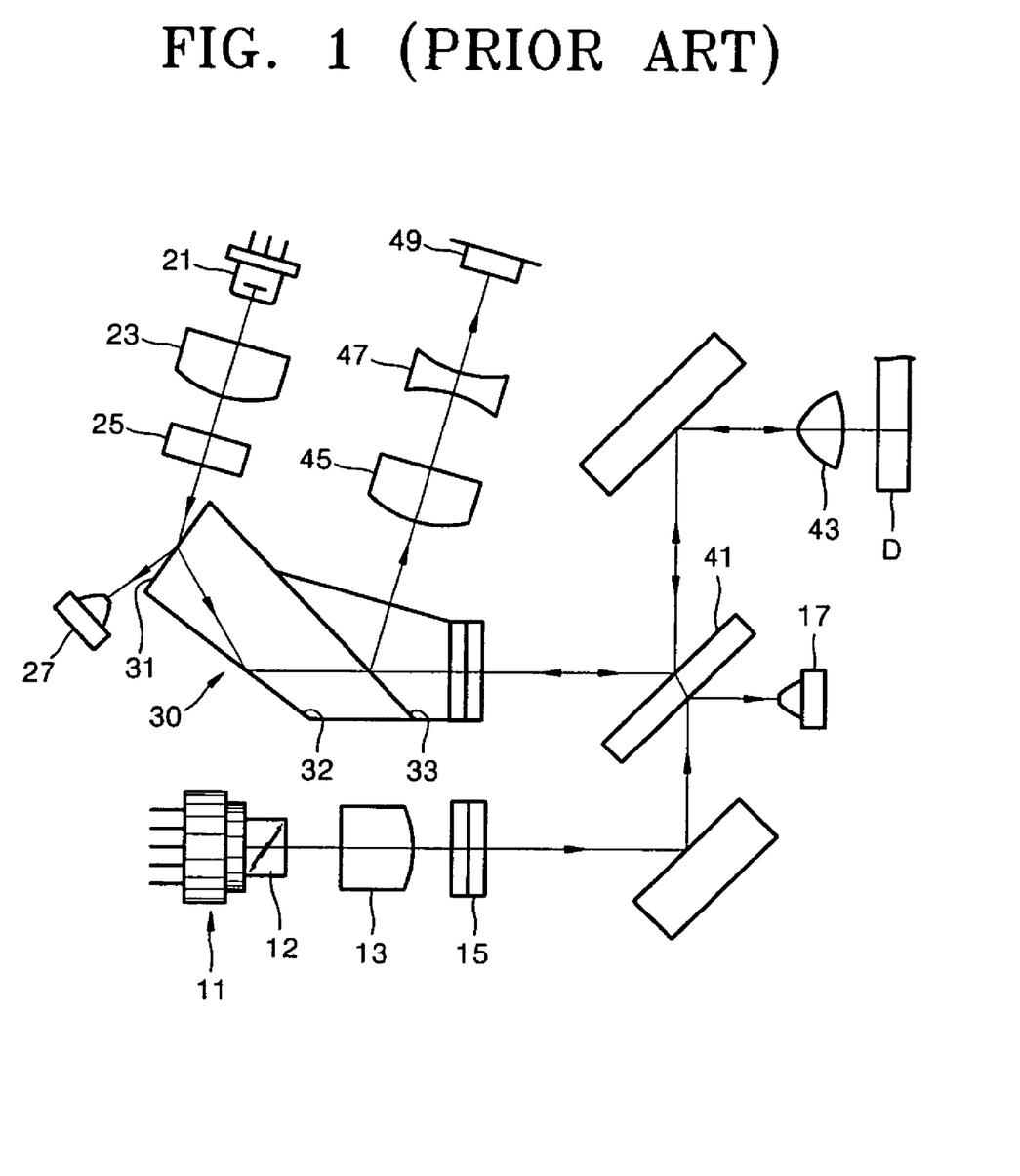
FIG. 1 is a view illustrating the optical configuration of a conventional compatible optical pickup apparatus.

Referring to FIG. 1, a conventional compatible optical pickup apparatus includes an optical module 11 for emitting light having a predetermined wavelength and receiving light reflected from an optical recording medium D, a second light source 21 for emitting light having a wavelength different from the light source module 11, a beam shaping prism 30 for changing a proceeding path of incident light and correcting an incident beam, a beam splitter 41 for changing a proceeding path of incident light, an objective lens 43 for focusing incident light and forming a light spot on the optical recording medium D, and a main photodetector 49 for receiving incident light that is reflected from the optical recording medium D and passes through the beam splitter 41 and the beam shaping prism 30 and detecting an information signal and an error signal.

The light source module 11 is a module in which a first light source (not shown), a photodetector (not shown) that is arranged proximally to the first light source, and a holographic optical element 12 are integrally formed. Light emitted from the first light source transmits straight and proceeds toward the optical recording medium D. Light reflected from the optical recording medium D is diffracted by the holographic optical element 12 so as to be formed on the photodetector.

A first grating 15 for diffracting and transmitting the light emitted from the first light source into a $0^{th}$ order beam, $\pm 1^{st}$ order beams, $\pm 2^{nd}$ order beams, and so on, and a first coupling lens 13 primarily converging divergent light emitted from the first light source, are provided in an optical path between the light source module 11 and the beam splitter 41. Most of the light emitted from the first light source and proceeds toward the beam splitter 41 and proceeds toward the optical recording medium D while part of the light is reflected by the beam splitter 41 and received by a first monitoring photodetector 17. The optical power of the first light source can be estimated from the amount of light received by the first monitoring photodetector 17, which enables control of the optical power of the first light source.

The second light source 21 is formed of a semiconductor laser that emits light having a relatively short wavelength compared to the first light source.

Figure 2:
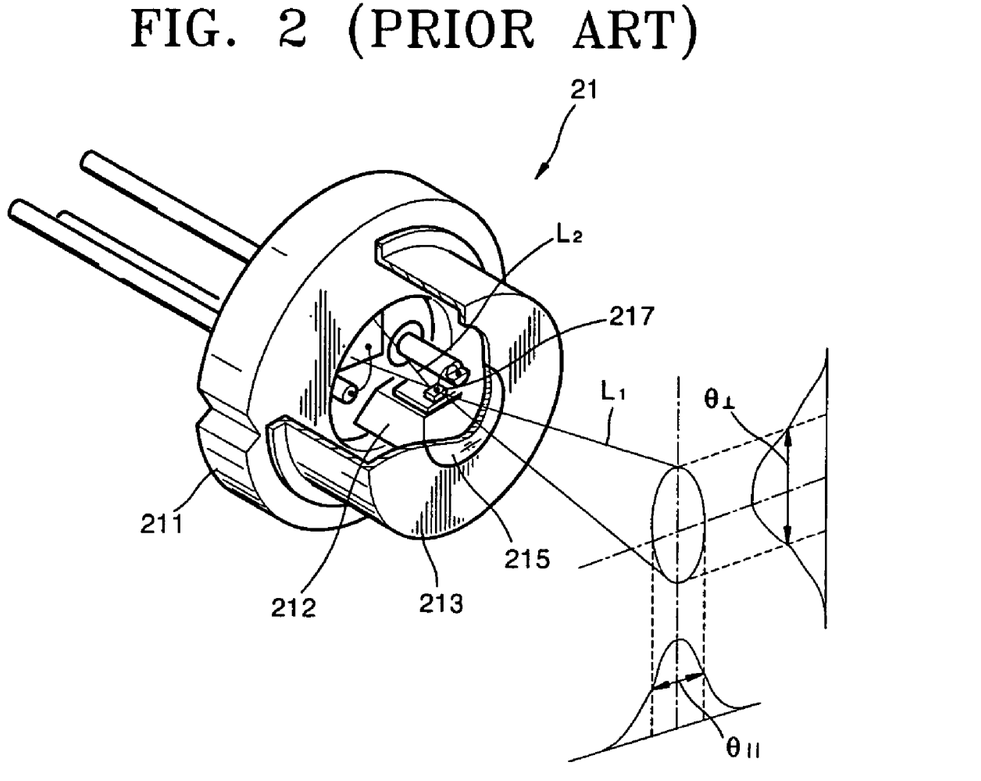
FIG. 2 is a partially cut-away perspective view illustrating the second light source of FIG. 1.

Referring to FIG. 2 in the second light source 21, a cap 213 having a window 215 that a laser beam transmits from is provided on a base 211. A mount 212 is provided on the base 211 and a semiconductor laser 217 for emitting a laser beam having a predetermined wavelength from the opposite side surfaces is installed on a side wall of the mount 212.

Figure 3:
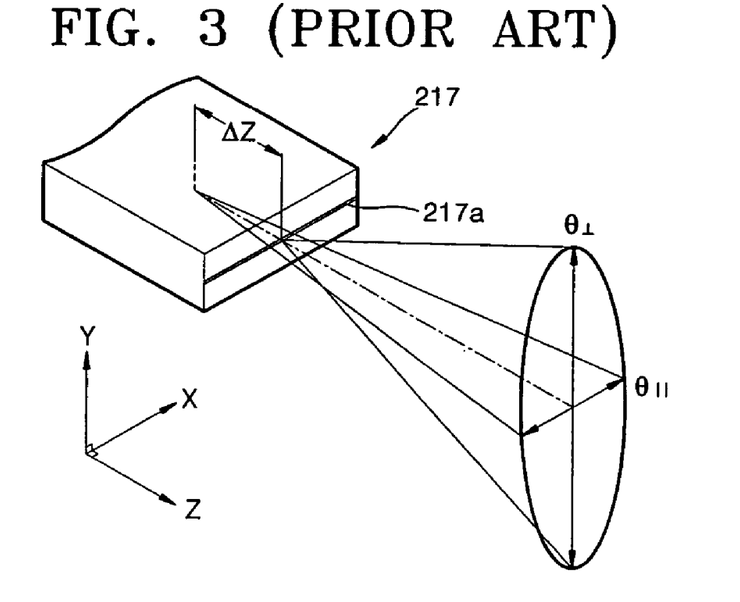
FIG. 3 is a view illustrating a conventional semiconductor laser.

Referring to FIG. 3, the laser beam emitted from a predetermined position of an active layer 217a of the semiconductor laser 217 maintains an oval sectional shape. This is due to a phenomenon in which the laser beam is diffracted differently in each of a thickness direction (Y-axis direction) of the active layer 217a and a widthwise direction (X-axis direction) perpendicular thereto because the size of an outlet through which the laser beam is emitted is different according to the thickness direction and the widthwise direction. The laser beam in the thickness direction is apparently emitted from the front side of the semiconductor laser 217 and the laser beam in the widthwise direction is apparently emitted from a position located in the rear as much as $\Delta Z$ from the front side of the semiconductor laser. The difference in distance $\Delta Z$ is referred to as astigmatism. In FIG. 2, $\theta_{\Pi}$ denotes an angle of the laser beam spreading in the widthwise direction and $\theta_{\perp}$ denotes an angle of the laser beam spreading in the vertical direction.

The optical pickup apparatus adopting the semiconductor laser has a problem of astigmatism generated due to the structural property of a light source. That is, when the astigmatism is large, a jitter property deteriorates during reproduction of a signal reflected from the optical recording medium D through the main photodetector of the optical pickup apparatus so that signal detection is severely affected. Jitter refers to a phenomenon in which deviation of a signal increases when a pit recorded on the optical recording medium is formed poorly or the shape of the light spot formed on the optical recording medium is asymmetrical. Such a phenomenon has a large affect when information is stored in the optical recording medium. Thus, in order to use the light source module in the optical pickup apparatus for recording, beam shaping is necessary.

Referring now to FIG. 1, the beam shaping prism 30 shapes incident light having an oval profile so that a light spot having a circular profile is formed on the optical recording medium D. By shaping the beam, information can be recorded with respect to the optical recording medium D using the light emitted from the second light source 21.

A second coupling lens 23 for concentrating incident divergent light and a second grating 25 diffracting and transmitting incident light are arranged in the optical path between the second light source 21 and the beam shaping prism 30.

The beam shaping prism 30 has an incident surface 31 on which the light emitted from the second light source 21 is incident, a reflective surface 32 on which the incident light is reflected, and an output reflective surface 33 on which the light reflected from the reflective surface 32 is transmitted in a straight direction and the light incident from the optical recording medium D is reflected toward the main photodetector 49. Thus, the light emitted from the second light source 21 and transmitting the output reflective surface 33 is reflected by the beam splitter 41 and proceeds toward the optical recording medium D.

A second monitoring photodetector 27 is arranged at a predetermined position facing the incident surface 31. The second monitoring photodetector 27 receives part of the light emitted from the second light source 21 and reflected from the incident surface 31 and detects the optical power of the second light source 21.

A collimating lens 45 for concentrating incident light and a sensor lens 47 for adjusting the size of incident light and changing a focal position of the incident light are arranged on the optical path between the output reflective surface 33 and the main photodetector 49.

The compatible optical pickup apparatus configured as above can record and reproduce information with respect to optical recording media in different formats. Since a plurality of optical elements including the beam shaping prism are used for recording, manufacturing costs increase and the structure becomes complicated so that the size of the optical pickup apparatus increases and the number of work steps increases. Furthermore, by adopting the beam shaping prism, when the optical pickup apparatus is operated at a high temperature, the optical axis may deviate.

SUMMARY OF THE INVENTION

To solve the above problems and provide additional benefits, the present invention provides a compatible optical pickup apparatus and method having a simplified structure by improving the structure of the beam shaping prism and modifying the arrangement of the optical elements for performing beam shaping.

According to an aspect of the present invention, a compatible optical pickup apparatus and method comprise a first light source for generating and emitting a first light having a predetermined wavelength, a second light source for generating and emitting a second light having a wavelength different from the wavelength of the first light, a beam shaping beam splitter provided in paths of the first and second lights for shaping the first and second lights that are incident in order to change a shape of a profile of each of the first and second lights to a circular shape and changing the proceeding paths of the first and second lights that are incident, an objective lens for focusing the first and second lights incident from the first and second light sources and forming light spots on an optical recording medium, and a main photodetector for receiving the first and second lights that are incident by being reflected from the optical recording medium and passing through the objective lens and the beam shaping beam splitter, and detecting an information signal and an error signal.

The beam shaping beam splitter comprises a first surface arranged inclined at a predetermined angle with respect to optical axes of the first and second lights emitted from the first and second light sources and refracting most of the incident light and reflecting the first and second lights incident from the optical recording medium toward the main photodetector, and a second surface for transmitting the first light in a straight direction and reflecting most of the second light such that the first and second lights emitted from the first and second light sources proceed toward the first surface along the same optical path.

According to another aspect of the present invention, a compatible optical pickup apparatus and method comprise a first light source for generating and emitting a first light having a predetermined wavelength, an optical module for generating and emitting a second light having a wavelength different from the wavelength of the first light and receiving the second light reflected from the optical recording medium, a beam shaping beam splitter provided in paths of the first and second lights for shaping the first and second lights that are incident in order to change a shape of a profile of each of the first and second lights to a circular shape and changing the proceeding paths of the first and second lights that are incident, an objective lens for focusing the first and second lights incident from the first light source and the optical module and forming light spots on an optical recording medium, and a main photodetector for receiving the first light that is incident by being reflected from the optical recording medium and passing through the objective lens and the beam shaping beam splitter, and detecting an information signal and an error signal.

The optical module comprises a second light source for emitting the second light, a second main photodetector provided around the second light source for detecting the information signal and the error signal by receiving the second light that is incident by being reflected from the optical recording medium and passing through the beams shaping beam splitter, and a first holographic optical element transmitting in a straight direction the second light incident from the second light source toward the beam shaping beam splitter and diffracting and transmitting light incident from the beam shaping beam splitter toward the second main photodetector.

BRIEF DESCRIPTION OF THE DRAWINGS

The above and other features and advantages of the present invention will become more apparent by describing in detail embodiments thereof with reference to the accompanying drawings in which.

In the drawings, it should be understood that the same reference numerals are used throughout the drawings.

DETAILED DESCRIPTION OF THE PREFFERED EMBODIMENTS

Figure 4:
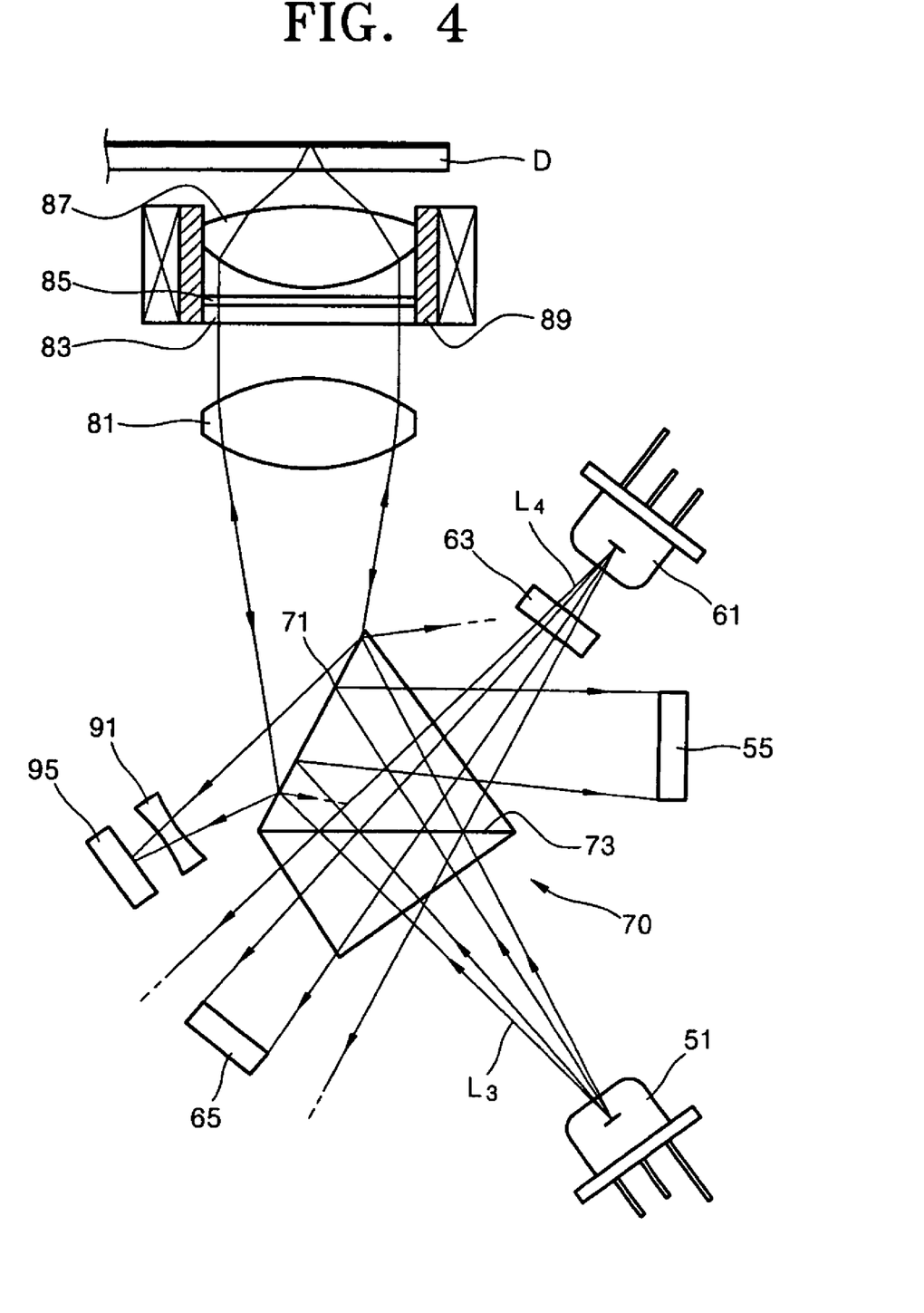
FIG. 4 is a view illustrating the optical arrangement of a compatible optical pickup apparatus according to an embodiment of the present invention.

Referring to FIG. 4, a compatible optical pickup apparatus according to an embodiment of the present invention includes first and second light sources 51 and 61 for emitting first and second lights $L_3$ and $L_4$ having different wavelengths, a beam shaping beam splitter 70 performing beam shaping and changing proceeding paths of the first and second lights $L_3$ and $L_4$, an objective lens 87 for focusing the first and second lights $L_3$ and $L_4$ emitted from the first and second light sources 51 and 61 and forming light spots on the optical recording medium D, and a main photodetector 95 for receiving the first and second lights $L_3$ and $L_4$ reflected from the optical recording medium D and detecting an information signal and an error signal.

The first light source 51 generates and emits the first light $L_3$ having a predetermined wavelength and the second light source 61 generates and emits the second light $L_4$ having a predetermined wavelength different from that of the first light $L_3$. For example, the first light source 51 performing recording a and/or reproduction function when a DVD is adopted as the optical recording medium D emits the first light $L_3$ having a wavelength of about 650 nm. The second light source 61 performing a recording and/or reproduction function when a CD is adopted as the optical recording medium D emits the second light $L_4$ having a wavelength of about 780 nm.

The beam shaping beam splitter 70 is arranged in an optical path between the first and second light sources 51 and 61, the objective lens 87, and the main photodetector 95. The beam shaping beam splitter 70 shapes a light beam to convert the profile of each of the first and second lights $L_3$ and $L_4$ from an oval shape to a circular shape. The beam shaping beam splitter 70 allows the first and second lights $L_3$ and $L_4$ emitted from the first and second light sources 51 and 61 to proceed toward the optical recording medium D and the first and second lights $L_3$ and $L_4$ reflected from the optical recording medium D to proceed toward the main photodetector 95.

For this purpose, the beam shaping beam splitter 70 includes a first surface 71 arranged to be inclined at a predetermined angle with respect to the first and second lights $L_3$ and $L_4$ emitted from the first and second light sources 51 and 61, respectively, and a second surface 73 that straight transmits the first light $L_3$ and reflects most of the second light $L_4$ so that the first and second lights $L_3$ and $L_4$ proceed toward the first surface 71 along the same optical path.

The first surface 71 refracts most of the light emitted from the first and second light sources 51 and 61 so that the profile of each of the first and second lights $L_3$ and $L_4$ is shaped into a circular shape. The principle of the beam shaping is described below with reference to FIG. 5.

Figure 5:
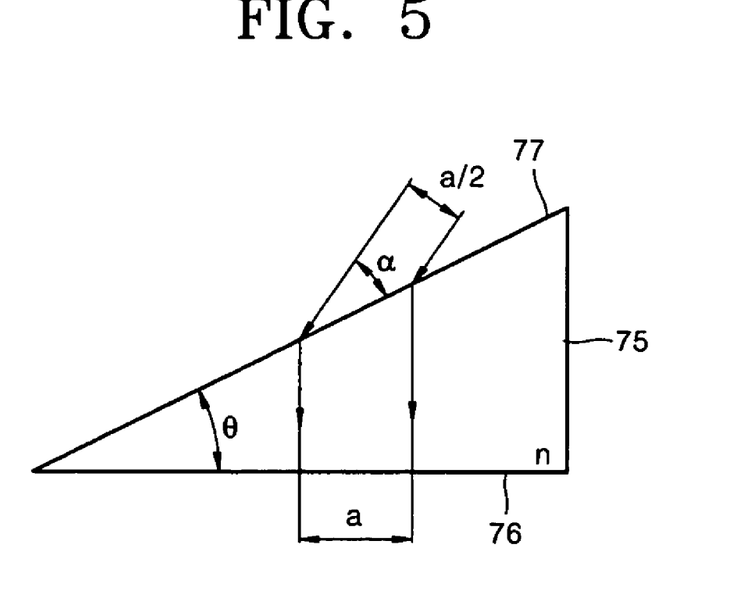
FIG. 5 is a view illustrating beam shaping for a beam shaping prism of FIG. 4.

Referring to FIG. 5, a beam shaping prism 75 corresponding to the beam shaping beam splitter 70 of FIG. 4 is a transparent member having a refractive index "n" and has a base plane 76 and an inclined plane 77 arranged to be inclined by an angle "θ" about the base plane 76. A laser beam is incident on the inclined plane 77 at an inclination angle "α" and exits through the base plane 76.

In the above arrangement, when the diameter of the profile of an exit beam is to be set to "a" with respect to an incident beam having a diameter of the profile that is "a/2", for example, the angle θ and the angle α are set as follows. Here, the beam shaping prism 75 is a medium having a refractive index "$n_d$" that is 1.514362.

The angle θ and the angle α can be obtained by simultaneously solving an equation according to Snell's law expressed by Equation 1 and an equation according to a geometrical shape expressed by Equation 2:

$$\sin(90-\alpha) = n_d \sin\theta \quad \text{[Equation 1]}$$

$$2\sin\alpha = \cos\theta \quad \text{[Equation 2]}$$

When the angle θ and the angle α are obtained by simultaneously solving Equations 1 and 2, the angle θ and the angle α are 37.29° and 23.44°, respectively.

The above description relates to one direction, for example, a horizontal direction (the direction $\theta_{\text{II}}$ of FIG. 1), of the light incident on the beam shaping prism 75. The beam shaping prism 75 transmits light in a direction perpendicular to the horizontal direction, for example, a vertical direction (the direction $\theta\perp$ of FIG. 1), without a change in the diameter of a profile of the light. Thus, by setting the angle θ and the angle α to predetermined angles, when a laser beam having an oval profile is incident on the beam shaping prism 75, the oval profile can be shaped into a circular profile and the size of an exit laser beam can be changed as one desires.

Referring to FIG. 4, part of the first light $L_3$ emitted from the first light source 51 is reflected from the first surface 71. Thus, a first monitoring photodetector 55 for receiving the first light $L_3$ that is reflected from the first surface 71 to monitor the optical power of the first light source 51 is further provided on the optical path of the first light $L_3$.

The first surface 71 reflects part of the first and second lights $L_3$ and $L_4$ reflected from the optical recording medium D toward the main photodetector 95. The change of the optical path by the first surface 71 is available according to a predetermined light amount ratio or a polarization property.

The first surface 71 may be polarization-coated for the change in the optical path according to the polarization property. That is, the first surface 71 is coated such that it can transmit most of one linearly polarized beam with respect to the first and second lights $L_3$ and $L_4$ and reflect most of the other linearly polarized beam perpendicular to the above linearly polarized beam.

In this case, a ¼ wave plate 85 is further provided on the optical path between the objective lens 87 and the beam shaping beam splitter 70. The ¼ wave plate 85 changes an incident linearly polarized beam into a circularly polarized beam, and vice versa. Thus, when the light having a predetermined polarization is diffracted by the first surface 71 and passes through the ¼ wave plate 85 twice and reenters the first surface 71, the polarization direction of the light changes by 90° and is perpendicular to the original polarization direction.

The first surface 71 is coated, for example, the first surface 71 transmits over 99% of a vertical polarization and reflects over 99% of a horizontal polarization with respect to light having 650 nm and 780 nm wavelengths. Thus, the light having a vertical polarization is emitted from the first and second light sources 51 and 61 and is refracted and transmited to the first surface 71 and proceeds toward the optical recording medium D. As the light transmits through the ¼ wave plate 85, the polarization of the light changes to a circular polarization. The polarization of the light changes to a horizontal polarization as the light is reflected from the optical recording medium D and retransmits through the ¼ wave plate 85. Most of the light having a horizontal polarization is reflected from the first surface 71 and proceeds to the main photodetector 95.

The second surface 73 of the beam shaping beam splitter 70 is coated such that the second surface 73 transmits most of the first light $L_3$ and reflects most of the second light $L_4$. For example, the second surface 73 may be coated so as to transmit all light having a 650 nm wavelength and reflect over 99% of light having a 780 nm wavelength with respect to the vertical polarization.

By forming the second surface 73 having the above reflection property, the first and second lights $L_3$ and $L_4$ emitted from the first and second light sources 51 and 61, respectively, proceed toward the optical recording medium D along the same optical path.

Part of the second light $L_4$ emitted from the second light source 61 is transmited to the second surface 73. Thus, a second monitoring photodetector 65 for receiving the second light $L_4$ for monitoring the optical power of the second light source 61 is further provided in the optical path of the second light $L_4$ that is transmited from the second surface 73.

A grating 63 for diffracting and transmitting the inclined light is provided on the optical path between the second light source 61 and the beam shaping beam splitter 70. The grating 63 diffracts the incident second light $L_4$ into a $0^{th}$ order beam, $\pm 1^{st}$ order beams, $\pm 2^{nd}$ order beams, and so on, and transmits the diffracted beams. The diffracted beams are used for the main photodetector 95 for detecting a track error signal in a three-beam method. Since the three-beam method is well known, a detailed description thereof will be omitted.

The objective lens 87 focuses the light emitted from first and second light sources 51 and 61 and forms a light spot on the optical recording medium D. The objective lens 87 is installed on a bobbin 89 for driving in a track direction and a focus direction according to an error signal detected by the main photodetector 95. A collimating lens 81 for concentrating a divergent light incident from the beam shaping beam splitter 70 for converting the light into a parallel beam is further provided in the optical path between the objective lens 87 and the beam shaping beam splitter 70.

Also, a holographic optical element 83 for selectively generating astigmatism with respect to the incident first and second lights $L_3$ and $L_4$ is further provided in the optical path between the beam shaping beam splitter 70 and the objective lens 87. The holographic optical element 83 transmits straight incident light incident from the beam shaping beam splitter 70 which has a linear polarization direction and generates astigmatism with respect to a circular polarization direction of the light incident from the optical recording medium D. The holographic optical element 83 has a light division property only for the light having a horizontal polarization of the light in a 650 nm wavelength range, for example.

The holographic optical element 83 is fixed on the bobbin 89 and driven with the objective lens 87 during the focusing and tracking operations of the objective lens 87. Also, as shown in FIG. 4, the holographic optical element 83 is integrally formed with the ¼ wave plate 85, which simplifies the structure of the optical pickup apparatus and simplifies assembly.

Figure 6:
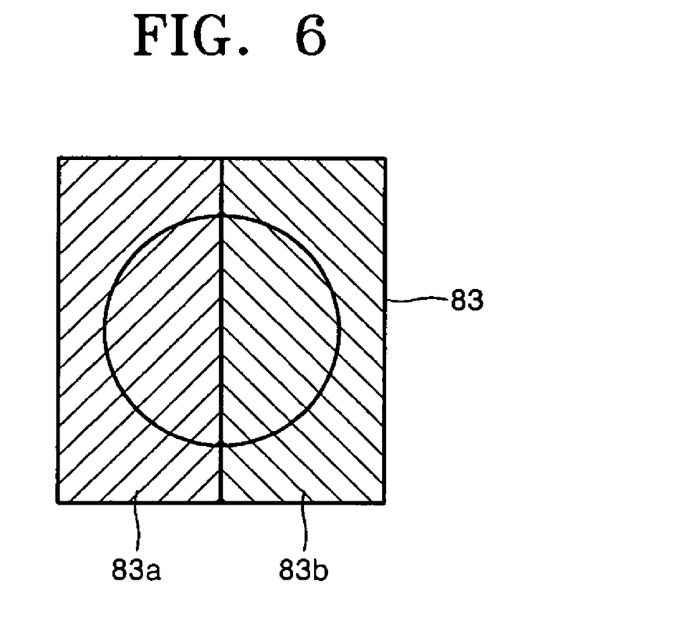
FIG. 6 is a view illustrating the sectional structure of the holographic element of FIG. 4.
Figure 7:
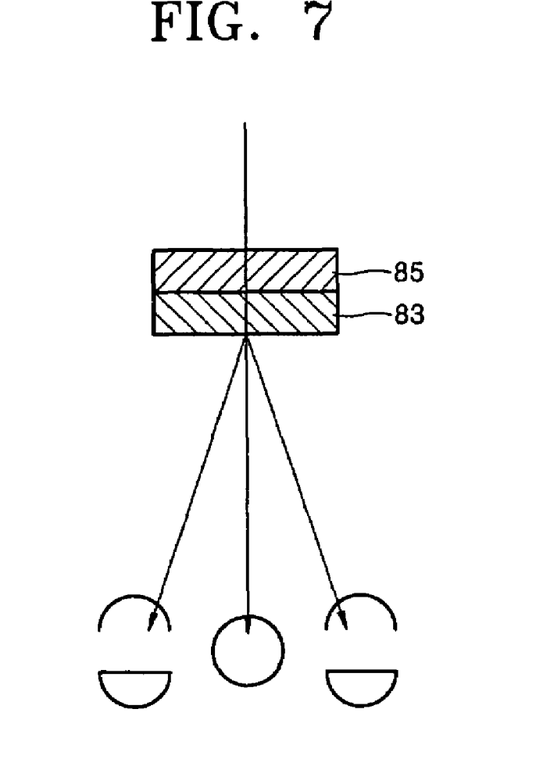
FIG. 7 is a view illustrating the diffraction property of the light reflected from the optical recording medium by the holographic element of FIG. 4.

Referring to FIG. 6, the holographic optical element 83 has sectioned surfaces 83a and 83b divided into at least two surfaces. A hologram pattern is formed such that one sectioned surface 83a generates positive astigmatism and the other sectioned surface 83b generates negative astigmatism. Thus, as shown in FIG. 7, the light incident from the optical recording medium D is divided into a $0^{th}$ order beam, $+1^{st}$ order beam, and $-1^{st}$ order beam and proceeds toward the main photodetector 95.

By providing the holographic optical element 83, the focusing operation of the objective lens 87 is performed as the main photodetector 95 differentially detects the positive astigmatism and the negative astigmatism generated from the two sectioned surfaces 83a and 83b.

The main photodetector 95 receives the first and second lights $L_3$ and $L_4$ coming from the optical recording medium D and reflected from the first surface 71 of the beam shaping beam splitter 71 and detects an information signal, a focusing error signal, a tracking error signal, and a tilt error signal.

Figure 8:
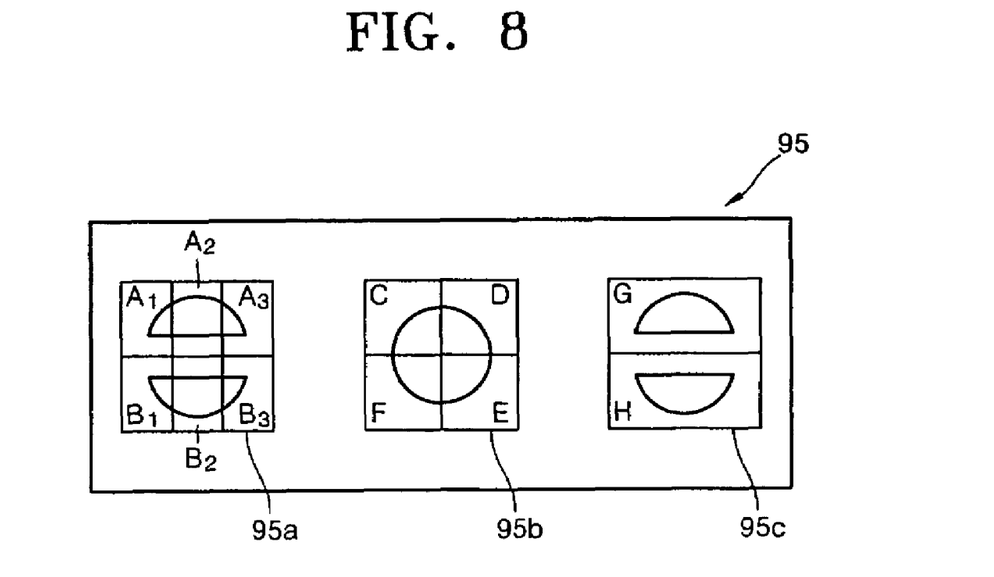
FIG. 8 is a view illustrating the sectional structure of the main photodetector of FIG. 4.

For this purpose, the main photodetector 95, as shown in FIG. 8, includes the first through third light receiving portions 95a, 95b, and 95c. The first light receiving portion 95a detects all focusing error signals and part of tracking error signals during recording and reproduction of the information with respect to the optical recording medium D corresponding to the first light $L_3$. The first light receiving portion 95a also detects focusing error signals during recording and reproduction of the information with respect to the optical recording medium D corresponding to the second light $L_4$. To this end, the first light receiving portion 95a includes six sectioned plates $A_1$, $A_2$, $A_3$, $B_1$, $B_2$, and $B_3$ arranged in a 2×3 array, with each sectioned plate independently performing photoelectric conversion.

The second light receiving portion 95b detects the information signal during recording and reproduction of the information with respect to the optical recording medium D corresponding to the first and second lights $L_3$ and $L_4$. The second light receiving portion 95b also detects a tilt error signal during recording and reproduction of the information with respect to the optical recording medium D corresponding to the first lights $L_3$. To this end, the second light receiving portion 95b includes four sectioned plates C, D, E, and F arranged in a 2×2 array, with each sectioned plate independently performing photoelectric conversion.

The third light receiving portion 95c detects, together with the first light receiving portion 95a, the tracking error signal during recording and reproduction of the information with respect to the optical recording medium D corresponding to the first light $L_3$. To this end, the third light receiving portion 95c includes two sectioned plates G and H arranged in a 2×1 array, with each sectioned plate independently performing photoelectric conversion.

During the recording and reproduction of information using the first light $L_3$, the focusing error signal FES, the tracking error signal TES, the tilt error signal TS, and the information signal (a radio frequency signal: RF) using the first through third light receiving portions 95a, 95b, and 95c are detected by being summed and differentiated as shown in Equation 3:

$$FES = A_2 - B_2$$
$$TES = (G-H) - \{(A_1+A_2+A_3)-(B_1+B_2+B_3)\} \quad \text{[Equation 3]}$$
$$TS = (C+D) - (E+F)$$
$$RF = C+D+E+F$$

During the recording and reproduction of information using the second light $L_4$, the focusing error signal FES and the information signal RF using the first through third light receiving portions 95a, 95b, and 95c are detected by being summed and differentiated as shown in Equation 4. The tracking error signal is detected in a different phase detection (DPD) method.

$$FES = A_2 - B_2$$
$$RF = C+D+E+F \quad \text{[Equation 4]}$$

The main photodetector 95 may adopt various structures other than the above 12 sectioned structure.

Referring to FIG. 1, a concave lens 91 for diverging incident light is further provided in the optical path between the beam shaping beam splitter 70 and the main detector 95. By providing the concave lens 91, the installation position of the main photodetector 95 may be adjusted.

Figure 9:
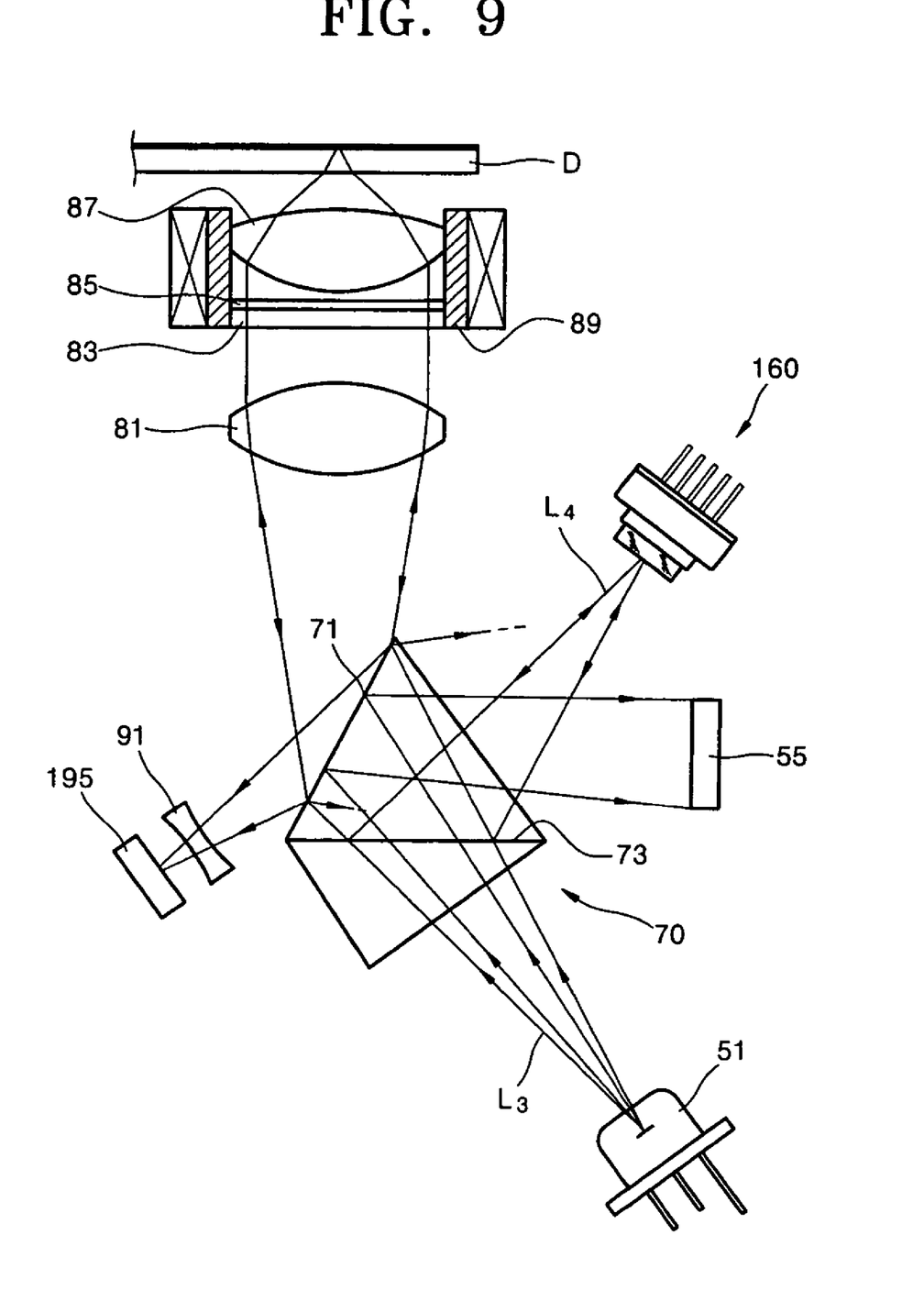
FIG. 9 is a view illustrating the optical arrangement of a compatible optical pickup apparatus according to another embodiment of the present invention.

Referring to FIG. 9, a compatible optical pickup apparatus according to another embodiment of the present invention includes the first light source 51 generating and emitting the first light $L_3$ having a predetermined wavelength, an optical module 160 for generating and emitting the second light $L_4$ and receiving the second light $L_4$ reflected from the optical recording medium D, the beam shaping beam splitter 70 for performing beam shaping and changing the proceeding paths of the first and second lights $L_3$ and $L_4$, the objective lens 87 for focusing the first and second lights $L_3$ and $L_4$ emitted from the first light source 51 and the optical module 160, respectively, and forming light spots on the optical recording medium D, and a first main photodetector 195 for receiving the first light $L_3$ reflected from the optical recording medium D and detecting an information signal and an error signal with respect to the optical recording medium D using the first light $L_3$.

The first light source 51 performs a recording and/or reproduction function when a DVD is adopted as the optical recording medium D and emits the first light $L_3$ having a predetermined wavelength, for example, a 650 nm wavelength. The recording and reproduction of the information signal using the first light $L_3$ emitted from the first light source 51 are substantially the same as those in the compatible optical pickup apparatus in the previous embodiment.

That is, most of the light $L_3$ emitted from the first light source 51 is refracted and transmited to the beam shaping beam splitter 70 and focused on the optical recording medium D by the objective lens 81. Part of the light $L_3$ is reflected by the beam shaping beam splitter 70 and received by the first monitoring photodetector 55. The received light is used to control the optical power of the first light source 51. The light reflected from the optical recording medium D passes through the objective lens 87 and the beam shaping beam splitter 71 and is formed on the first main photodetector 195. The first main photodetector 195 detects the information signal and the error signal from the received light.

Figure 10:
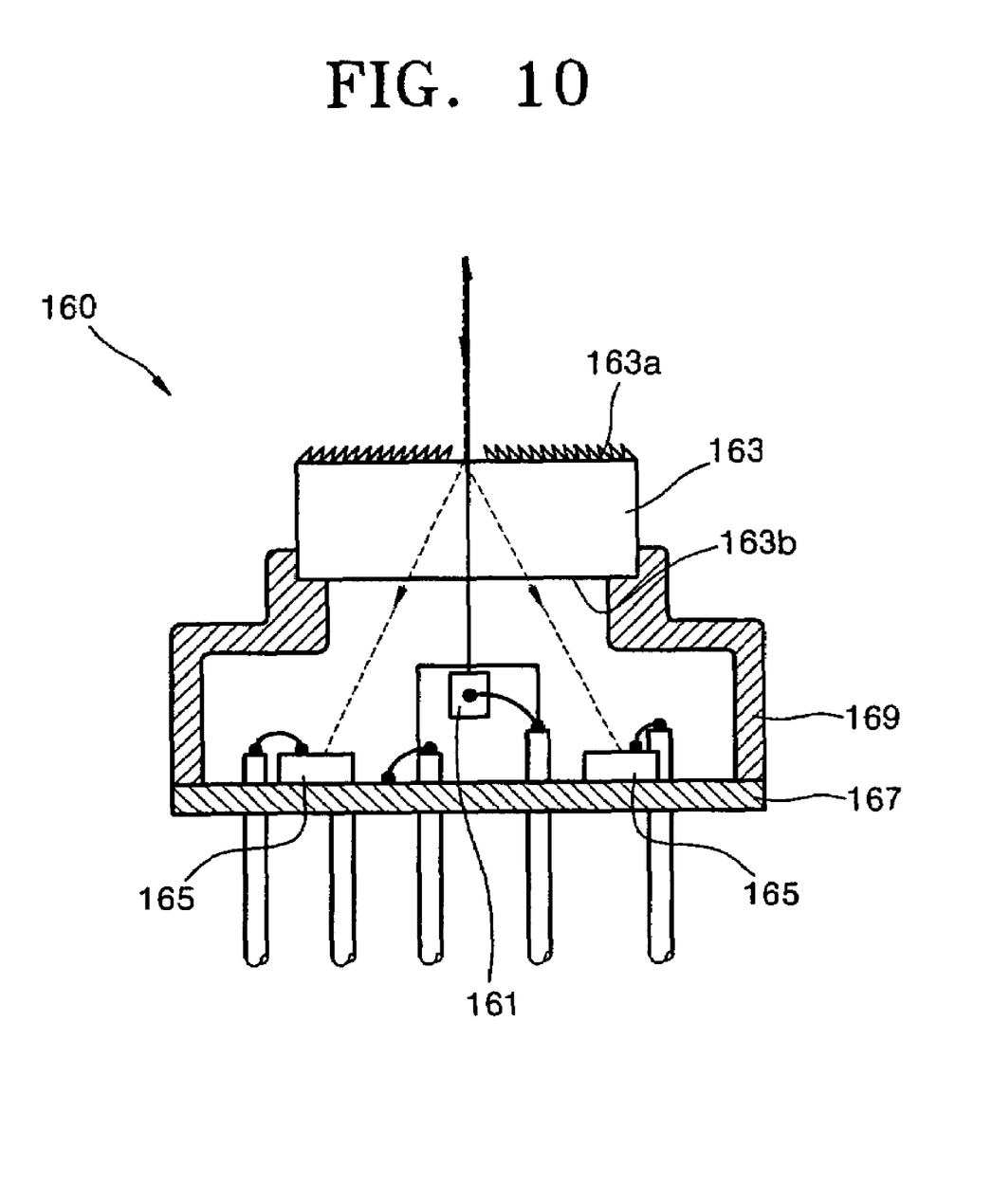
FIG. 10 is a sectional view illustrating the optical module of FIG. 9.

Referring to FIGS. 9 and 10, the optical module 160 includes a second light source 161 for emitting a second light $L_4$ having a predetermined wavelength different from the wavelength of the first light $L_3$, a second main photodetector 165 provided around the second light source 161 for receiving the second light $L_4$ that is reflected from the optical recording medium D and passes through the beam shaping beam splitter 70, and a first holographic optical element 163 for changing the proceed path of the second light $L_4$.

The first holographic optical element 163 has an outer surface 163a having a predetermined diffraction pattern and an inner surface 163b having a grating pattern. The first holographic optical element 163 transmits in a straight direction the second light $L_4$ emitted from the second light source 161 toward the beam shaping beam splitter 70, and diffracts the light incident from the beam shaping beam splitter 70 to be formed on the second main photodetector 165. Also, the optical module 160 includes a base 167 and a cap 169 for the arrangement of the above optical elements. Since the grating pattern formed on the inner surface 163b performs substantially the same function as the grating 63 in the previous embodiment, a detailed description thereof will be omitted.

The beam shaping beam splitter 70 is arranged in the optical path between the first light source 51 and the optical module 160, and between the objective lens 87 and the first main photodetector 195. The beam shaping beam splitter 70 shapes a beam in order to change the shape of the profile of each of the first and second lights $L_3$ and $L_4$ respectively emitted from the first light source 51 and the second light source 161 into a circular shape. Also, the beam shaping beam splitter 70 allows the first and second lights $L_3$ and $L_4$ respectively emitted from the first light source 51 and the second light source 161 to proceed toward the optical recording medium D. Further, the beam shaping beam splitter 70 refracts the first light $L_3$ reflected from the optical recording medium D toward the first main photodetector 195 and the second light $L_4$ toward the optical module 160.

For this purpose, the beam shaping beam splitter 70 includes the first surface 71 arranged inclined at a predetermined angle with respect to the first and second lights $L_3$ and $L_4$ emitted from the first light source 51 and the second light source 161, respectively, and the second surface 73 that transmits in a straight direction the first light $L_3$ and reflects most of the second light $L_4$ so that the first and second lights $L_3$ and $L_4$ proceed toward the first surface 71 along the same optical path.

Since the structure and function of the beams shaping beam splitter 70 configured as above are substantially the same as those of the beam shaping beam splitter 70 according to the previous embodiment described with reference to FIGS. 4 and 5, a detailed description thereof will be omitted.

In the present embodiment, the collimating lens 81, the second holographic optical element 83, and the ¼ wave plate 85 are further provided in the optical path between the objective lens 87 and the beam shaping beam splitter 70. Also, the concave lens 91 is further provided in the optical path between the beam shaping ban splitter 70 and the first main photodetector 195. Since the structures and functions of the above-described optical elements are substantially the same as the optical elements using the same reference numerals of the compatible optical pickup apparatus according to the previous embodiment of the present invention, detailed descriptions thereof will be omitted.

The first main photodetector 195 receives the first light $L_3$ incident from the optical recording medium D and reflected from the first surface 71 and detects the information signal, the focusing error signal, and the tracking error signal. The first main photodetector 195 is different from the main photodetector 95 of FIG. 4 according to the previous embodiment in that it does not detect the information signal and the error signal with respect to the second light $L_4$. In this case, since the sectioned structure of the first main photodetector 195 is well known, a detailed description thereof will be omitted.

As described above, in the compatible optical pickup apparatus according to an embodiment of the present invention, since the beam shaping beam splitter is used to perform beam shaping and changing the optical paths with respect to both first and second lights, the beam shaping is possible and a recording property to the optical recording medium can be improved. Also, the structure of the optical pickup apparatus can be simplified and the number of optical parts can be reduced so that an assembly feature is simplified and manufacturing costs are reduced.

In addition, by decreasing the size of the profile of each of the first and second lights proceeding toward the optical recording medium during the beam shaping, the amount of light incident on the collimating lens increases so that optical efficiency is improved.

What is claimed is:

1. A compatible optical pickup apparatus comprising:
   a first light source for generating and emitting a first light having a predetermined wavelength;
   a second light source for generating and emitting a second light having a wavelength different from the wavelength of the first light;

a beam shaping beam splitter provided in paths of the first and second lights for shaping the first and second lights that are incident in order to change a shape of a profile of each of the first and second lights to a circular shape and changing the proceeding paths of the first and second lights that are incident;

an objective lens for focusing the first and second lights incident from the first and second light sources and forming light spots on an optical recording medium;

a main photodetector for receiving the first and second lights that are incident by being reflected from the optical recording medium and passing through the objective lens and the beam shaping beam splitter, and detecting an information signal and an error signal;

wherein the beam shaping beam splitter comprises:

a first surface arranged to be inclined at a predetermined angle with respect to optical axes of the first and second lights emitted from the first and second light sources and refracting most of incident light and reflecting the first and second lights incident from the optical recording medium toward the main photodetector; and a second surface for transmitting in a straight direction the first light and reflecting most of the second light such that the first and second lights emitted from the first and second light sources proceed toward the first surface along the same optical path.

2. The compatible optical pickup as claimed in claim 1, further comprising a first monitoring photodetector for receiving the first light emitted from the first light source and reflected from the first surface and monitoring an optical power of the first light source.

3. The compatible optical pickup as claimed in claim 1, further comprising a second monitoring photodetector for receiving the second light emitted from the second light source and reflected from the second surface and monitoring an optical power of the second light source.

4. The compatible optical pickup as claimed in claim 1, further comprising a grating arranged in an optical path between the second light source and the beam shaping beam splitter and diffracting light incident from the second light source.

5. The compatible optical pickup as claimed in claim 4, further comprising:

a holographic optical element arranged in an optical path between the beam shaping beam splitter and the objective lens for transmitting in a straight direction one of the first and second lights that are incident with respect to a polarization direction of light incident from the beam shaping beam splitter and generating astigmatism with respect to a polarization direction of the light incident from the optical recording medium; and a ¼ wave plate arranged on an optical path between the holographic optical element and the objective lens for changing polarization directions of the first and second lights that are incident.

6. The compatible optical pickup as claimed in claim 5, wherein the holographic optical element is fixed on the objective lens and driven with the objective lens during focusing and tracking operations of the objective lens.

7. The compatible optical pickup as claimed in claim 5, wherein the holographic optical element and the ¼ wave plate are integrally formed.

8. The compatible optical pickup as claimed in claim 5, wherein the holographic optical element comprises sectioned surfaces divided into at least two surfaces, and a predetermined hologram pattern is formed on the sectioned surfaces such that one or more sectioned surface generates positive astigmatism and the other sectioned surface generates negative astigmatism.

9. The compatible optical pickup as claimed in claim 1, further comprising a collimating lens arranged in an optical path between the beam shaping beam splitter and the objective lens and concentrating divergent light incident from the beam shaping beam splitter to make the concentrated divergent light a parallel beam.

10. The compatible optical pickup as claimed in claim 1, further comprising:

a holographic optical element arranged on an optical path between the beam shaping beam splitter and the objective lens for transmitting in a straight direction one of the first and second lights that are incident with respect to a polarization direction of light incident from the beam shaping beam splitter and generating astigmatism with respect to a polarization direction of the light incident from the optical recording medium; and a ¼ wave plate arranged on an optical path between the holographic optical element and the objective lens for changing polarization directions of the first and second lights that are incident.

11. The compatible optical pickup as claimed in claim 10, wherein the holographic optical element is fixed on the objective lens and driven with the objective lens during focusing and tracking operations of the objective lens.

12. The compatible optical pickup as claimed in claim 10, wherein the holographic optical element and the ¼ wave plate are integrally formed.

13. The compatible optical pickup as claimed in claim 10, wherein the holographic optical element comprises sectioned surfaces divided into at least two surfaces, and a predetermined hologram pattern is formed on the sectioned surfaces such that one or more sectioned surfaces generate positive astigmatism and the other sectioned surface generates negative astigmatism.

14. The compatible optical pickup as claimed in claim 1, wherein the main photodetector comprises:

a first light receiving portion for detecting all focusing error signals and part of the tracking error signals of the objective lens during recording and reproduction of information with respect to the optical recording medium corresponding to the first light and detecting a focusing error signal during recording and reproduction of information with respect to the optical recording medium corresponding to the second light;

a second light receiving portion for detecting the information signal and a tilt error signal during recording and reproduction of information with respect to the optical recording medium corresponding to the first light, and detecting the information signal during recording and reproduction of information with respect to the optical recording medium corresponding to the second light; and a third light receiving portion for detecting a tracking error signal during recording and reproduction of information with respect to the optical recording medium corresponding to the first light, with the first light receiving portion.

15. The compatible optical pickup as claimed in claim 14, wherein the first light receiving portion comprises six sectioned plates $A_1$, $A_2$, $A_3$, $B_1$, $B_2$, and $B_3$ arranged in a 2×3 array, each sectioned plate independently performing a photoelectric conversion, and the focusing error signal is detected by differentiating the sectioned plates $A_2$ and $B_2$.

16. The compatible optical pickup as claimed in claim 15, wherein the third light portion comprises sectioned plates G and H arranged in a 2×1 array, each sectioned plate independently performing photoelectric conversion, and the tracking error signal is detected by differentiating a differential signal of the sectioned plates G and H and a differential signal that is detected by differentiating a sum signal of signals detected from the sectioned plates $A_1$, $A_2$, and $A_3$ and a sum signal of signals detected from the respective sectioned plates $B_1$, $B_2$, and $B_3$.

17. The compatible optical pickup as claimed in claim 14, wherein the second light receiving portion comprises four sectioned plates C, D, E, and F arranged in a 2×2 array, for performing photoelectric conversion, the information signal is detected by summing signals detected from the respective sectioned plates C, D, E, and F, and the tilt signal is detected by differentiating a sum signal of signals detected from the respective sectioned plates C and D and the sum signal detected from the respective sectioned plates E and F.

18. A compatible optical pickup apparatus comprising:
 a first light source for generating and emitting a first light having a predetermined wavelength;
 an optical module for generating and emitting a second light having a wavelength different from the wavelength of the first light and receiving the second light reflected from the optical recording medium;
 a beam shaping beam splitter provided in paths of the first and second lights for shaping the first and second lights that are incident in order to change a shape of a profile of each of the first and second lights to a circular shape and changing the proceeding paths of the first and second lights that are incident;
 an objective lens for focusing the first and second lights incident from the first light source and the optical module and forming light spots on an optical recording medium; and
 a main photodetector for receiving the first light that is incident by being reflected from the optical recording medium and passing through the objective lens and the beam shaping beam splitter, and detecting an information signal and an error signal.

19. The compatible optical pickup as claimed in claim 18, wherein the optical module comprises:
 a second light source for emitting the second light;
 a second main photodetector provided around the second light source for detecting the information signal and the error signal by receiving the second light that is incident by being reflected from the optical recording medium and passing through the beams shaping beam splitter; and
 a first holographic optical element for transmitting in a straight direction the second light incident from the second light source toward the beam shaping beam splitter and diffracting and transmitting light incident from the beam shaping beam splitter toward the second main photodetector.

20. The compatible optical pickup as claimed in claim 19, wherein the beam shaping beam splitter comprises:

a first surface arranged to be inclined at a predetermined angle with respect to optical axes of the first and second lights emitted from the first light source and the second light source and refracting most of the incident light and reflecting the first light incident from the optical recording medium toward the first main photodetector and refracting the second light toward the optical module; and
 a second surface for transmitting in a straight direction the first light and reflecting most of the second light such that the first and second lights emitted from the first and second light sources proceed toward the first surface along the same path and the second light incident from the first surface proceeds toward the optical module.

21. The compatible optical pickup as claimed in claim 20, further comprising a first monitoring photodetector for receiving the first light emitted from the first light source and reflected from the first surface and monitoring optical power of the first light source.

22. The compatible optical pickup as claimed in claim 18, further comprising a collimating lens arranged on an optical path between the beam shaping beam splitter and the objective lens a for condensing divergent light incident from the beam shaping beam splitter.

23. The compatible optical pickup as claimed in claim 18, further comprising:
 a second holographic optical element arranged in an optical path between the beam shaping beam splitter and the objective lens for transmitting in a straight direction one of the first and second lights that are incident with respect to a polarization direction of light incident from the beam shaping beam splitter and generating astigmatism with respect to a polarization direction of the light incident from the optical recording medium; and
 a ¼ wave plate arranged in an optical path between the second holographic optical element and the objective lens for changing polarization directions of the first and second lights that are incident.

24. The compatible optical pickup as claimed in claim 23, wherein the second holographic optical element is fixed on the objective lens and driven with the objective lens during focusing and tracking operations of the objective lens.

25. The compatible optical pickup as claimed in claim 23, wherein the second holographic optical element and the ¼ wave plate are integrally formed.

26. The compatible optical pickup as claimed in claim 23, wherein the second holographic optical element comprises sectioned surfaces divided into at least two surfaces, and a predetermined hologram pattern is formed on the sectioned surfaces such that one or more sectioned surface generates positive astigmatism and the other sectioned surface generates negative astigmatism.

* * * * *